(12) United States Patent
Melvin et al.

(10) Patent No.: US 6,288,881 B1
(45) Date of Patent: Sep. 11, 2001

(54) BATTERY VOLTAGE REGULATOR PROTECTION CIRCUITS

(76) Inventors: John A. Melvin, 653 Paddlewheel Dr., Westerville, OH (US) 43082; James D. Sullivan, 3555 Africa Rd., Westerville, OH (US) 43021

( * ) Notice: Subject to any disclaimer, the term of this patent is extended or adjusted under 35 U.S.C. 154(b) by 0 days.

(21) Appl. No.: 09/375,884

(22) Filed: Aug. 17, 1999

(51) Int. Cl.[7] ............................................ H02H 7/00
(52) U.S. Cl. ............................ 361/18; 361/84; 361/86; 361/104
(58) Field of Search ......................... 361/18, 84, 86, 361/93.8, 93.9, 103, 104, 91.1, 91.5; 307/127, 130; 323/273–276, 282–285

(56) References Cited

U.S. PATENT DOCUMENTS

| | | | |
|---|---|---|---|
| 4,733,159 | * | 3/1988 | Edwards et al. .................... 323/282 |
| 5,109,162 | * | 4/1992 | Koch et al. ........................ 307/127 |
| 5,625,518 | * | 4/1997 | Bober ................................ 361/56 |

* cited by examiner

*Primary Examiner*—Michael J. Sherry
(74) *Attorney, Agent, or Firm*—Frank H. Foster; Kremblas, Foster, Phillips & Pollick

(57) ABSTRACT

A voltage regulator protecting both the regulator and the electrical system. A flyback diode is protected by an auto-protected MOSFET in series with the flyback diode and controlling it by a drive circuit connected to the vehicle ignition switch. Protection against overcurrent is provided by a resettable fuse, having a thermal protection circuit, in series with the power switch. A relay is in series with the resettable fuse. The controlled switch is controlled by the output of a voltage detector. A latching circuit holds it open as long as the circuit remains connected to the battery. Overvoltage protection is provided by a voltage detector which opens the relay if the battery voltage exceeds a pre-selected voltage. To accommodate lead-acid and maintenance-free batteries, the regulator has two input ignition terminals one of which controls the set point voltage. The resettable fuse is physically mounted in thermal connection to the power switch which switches the field.

24 Claims, 11 Drawing Sheets

US 6,288,881 B1

BATTERY VOLTAGE REGULATOR PROTECTION CIRCUITS

(b) CROSS-REFERENCES TO RELATED APPLICATIONS (Not Applicable)

(c) STATEMENT REGARDING FEDERALLY-SPONSORED RESEARCH AND DEVELOPMENT (Not Applicable)

(e) BACKGROUND OF THE INVENTION

This invention relates generally to battery voltage regulator circuits of the type used for regulating the voltage of a battery in an electrical system of a vehicle and more particularly relates to protection circuits for protecting the regulator circuit and the vehicle electrical system from faults, such as misconnection during installation or alternator failures causing an alternator short circuit.

2. Description Of The Related Art

Most vehicles, such as transit buses, automobiles or boats, are powered by internal combustion engines which have an associated electrical system for providing electrical power to the engine and to equipment and accessories on the vehicle. Typically, the electrical system includes an alternator mechanically driven by the internal combustion engine for providing a charging current to the battery. A battery regulator senses battery voltage and switches the connection of the alternator field winding to the battery to control battery-charging current in order to assure that full battery charge is maintained without overcharging the battery and damaging it.

In the past, regulators were principally electromechanical devices which included relay-type structures and wirewound resistors. As electronic semiconductor devices have become both more sophisticated, less expensive and capable of operating at higher currents, electronic regulators have replaced the older electromechanical devices. Although electronic regulators offer improved performance, they are at greater risk of damage from a misconnection which can occur during installation of the regulator or from an electrical system failure because semiconductor devices are more easily damaged by excessive currents and reverse polarity misconnection. Since regulators are ordinarily three or four terminal devices, each terminal of which is supposed to be connected to its mating terminal in the electrical system, there are a variety of combinations of misconnections which are possible.

It is therefore a principal object and feature of the present invention to provide protective circuitry for protecting the regulator against misconnection and against alternator defects which occur during operation.

More particularly, it is an object and feature of the invention to protect the components of the regulator, so that no matter how the regulator circuit is misconnected in the vehicle electrical system, the regulator will not be damaged and therefore can be used when it is subsequently properly connected.

FIG. 1 illustrates the principles of prior art regulator circuitry 18. In a conventional electrical system, an alternator armature 10 is connected through a rectifier diode 12 to a battery 14 for charging the battery. The field winding 16 of the alternator is connected to a field terminal FLD and a ground terminal GND. The regulator circuit 18 receives its power from the battery 14 through an input terminal BAT connected directly to the battery, or, in some circuits, the input terminal is instead connected to an ignition terminal, often labeled IGN on the vehicle starting switch. An ignition switch terminal provides battery voltage to the regulator circuit 18, except when the ignition is turned off, as is well known in the art.

The prior art regulator circuit has a controlled power switch 22 in series with the field winding 16 and is connected either directly to the battery 14 or indirectly to the battery 14 through an ignition switch. The controlled power switch 22 is controlled by a voltage regulating circuit 24, which has an input 26 connected across the battery 14 for detecting the voltage of the battery 14. The voltage regulating circuit 24 closes the controlled power switch 22 when the voltage of battery 14 is below a selected voltage to apply battery voltage to the field 16 and opens the controlled power switch 22 when the battery voltage is above a selected voltage level.

The terms "switch", "controlled switch" and "controlled power switch" are used in the broad electronic sense as referring to a variety of switching devices which have a control input for switching them between their states. These include the well-known examples of relays and transistors which are commonly utilized as switches. The control inputs are typically the coil of a relay, the gate of a MOSFET transistor or the base or other terminal of a bipolar transistor, all of which are used in well-known transistor circuit configurations for providing a switching function. These circuits usually include supporting circuit elements, such as bias and current limiting resistors and protection diodes. Typically electronic switches have inputs connected to switch control circuits or drive circuits, of which there are many types. Typically, switch control circuits receive an input signal, such as a voltage or current, and have a reference voltage or current for comparison to the input voltage or current. They turn the switch on or off as the voltage or current magnitude rises above or falls below a set point reference. Switch drive circuits may include or be only a voltage, current or impedance transforming circuit or biasing circuit for changing magnitudes to values acceptable to the inputs of the device being driven.

Because the field winding 16 of an alternator is an inductor, when the controlled power switch 22 is opened the voltage across the field winding 16 will reverse polarity and the magnetic field will begin to collapse to maintain current flow through the field winding 16. A flyback diode 28 is provided as a path for that current flow as the magnetic field decays when the controlled power switch 22 is opened.

In the operation of this prior art circuit, when the battery is fully charged, the controlled power switch 22 may be switched on and off, typically at a 100–200 Hz rate, alternately applying the voltage of battery 14 to the field 16 at that rate and maintaining an essentially constant current through the field 16. If, however, the battery is discharged, the controlled power switch will be held on continuously and if the battery is overcharged, it will be held off continuously.

A few prior art regulators have an overvoltage protection circuit 30. Such a circuit has a voltage responsive switch which senses battery voltage and is connected in series in the circuit branch between the BAT terminal and the FLD terminal. This switch opens when the battery exhibits an overvoltage. However, the prior art overvoltage protection circuit 30 is not resettable. It is interposed in the circuit branch in order to protect the electrical system of the vehicle. Such prior art regulators must be sent back for servicing in order to be repaired or replaced before subsequent use. Consequently, such a circuit is not practical for protection against misconnection since misconnection effectively disables such a prior art regulator.

It is therefore another object and feature of the invention to provide protection circuitry which protects both the vehicle electrical system and the regulator circuit itself and does so in a manner which is entirely resettable so that once the misconnection is corrected or the defective electrical system component is repaired, the same voltage regulator may be installed and reused without requiring prior servicing.

BRIEF SUMMARY OF THE INVENTION

The flyback diode is protected by interposing a power transistor, preferably an autoprotected MOSFET, in series with the flyback diode and controlled by a drive circuit connected to the vehicle ignition switch for turning the power transistor on when the vehicle ignition switch is turned on.

Protection against overcurrent through the controlled power switch, which alternately connects and disconnects the battery to the field terminal, is provided by connecting a resettable fuse, which includes a thermal protection circuit, in series in the controlled power switch circuit branch extending between the battery terminal and the field coil. A controlled switch, such as a relay, is interposed in the same circuit branch in series with the resettable fuse. The controlled switch is controlled by the output of a voltage detector which opens the controlled switch when the resettable fuse is opened, and the fuse opening causes an increase in voltage drop across the resettable fuse and a corresponding reduction in voltage on the field winding side of the resettable fuse. Preferably a latching circuit is also connected to the controlled switch for holding it open as long as the circuit remains connected to the battery.

Overvoltage protection is provided by additionally providing a voltage detector having a voltage reference and detecting the battery voltage. The voltage detector opens the controlled switch, described above, in the event that the battery voltage exceeds a pre-selected set-point voltage, such as 32 volts for a 24 volt battery system.

In order to accommodate two different types of batteries, such as lead-acid and maintenance-free batteries, and the different full charge voltages associated with each, the regulator is provided with a pair of input ignition terminals. One of the terminals is connected to the vehicle ignition switch when one type of a battery is installed and the other is connected when the other type of battery is installed. One of these ignition terminals controls a switch, which switches the set point voltage to which the regulating circuit controls the battery voltage.

The sensitivity of the regulator to an overcurrent condition is improved by physically mounting the resettable fuse in thermal connection to the controlled power switch which switches the battery voltage applied to the field winding of the alternator.

Figure 1:
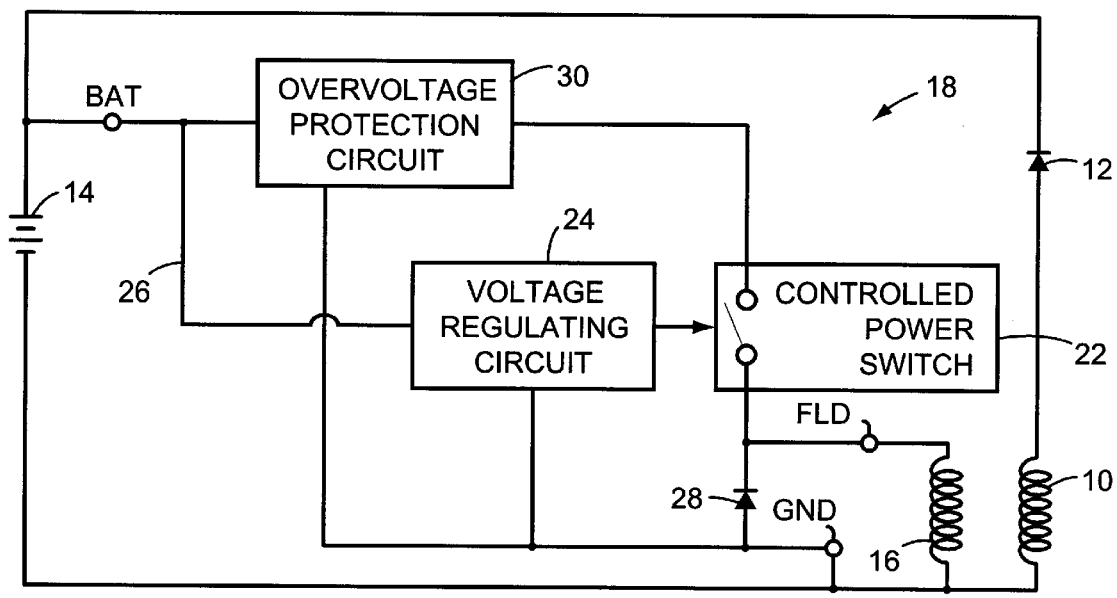
FIG. 1 is a block diagram of a prior art regulator circuit and the associated components of a vehicle electrical system.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other circuit elements where such connection is recognized as being equivalent by those skilled in the art. In addition, many circuits are illustrated which are of a type which perform well known operations on electronic signals. Those skilled in the art will recognize that there are many, and in the future may be additional, alternative circuits which are recognized as equivalent because they provide the same operations on the signals.

DETAILED DESCRIPTION OF THE INVENTION

Figure 2:
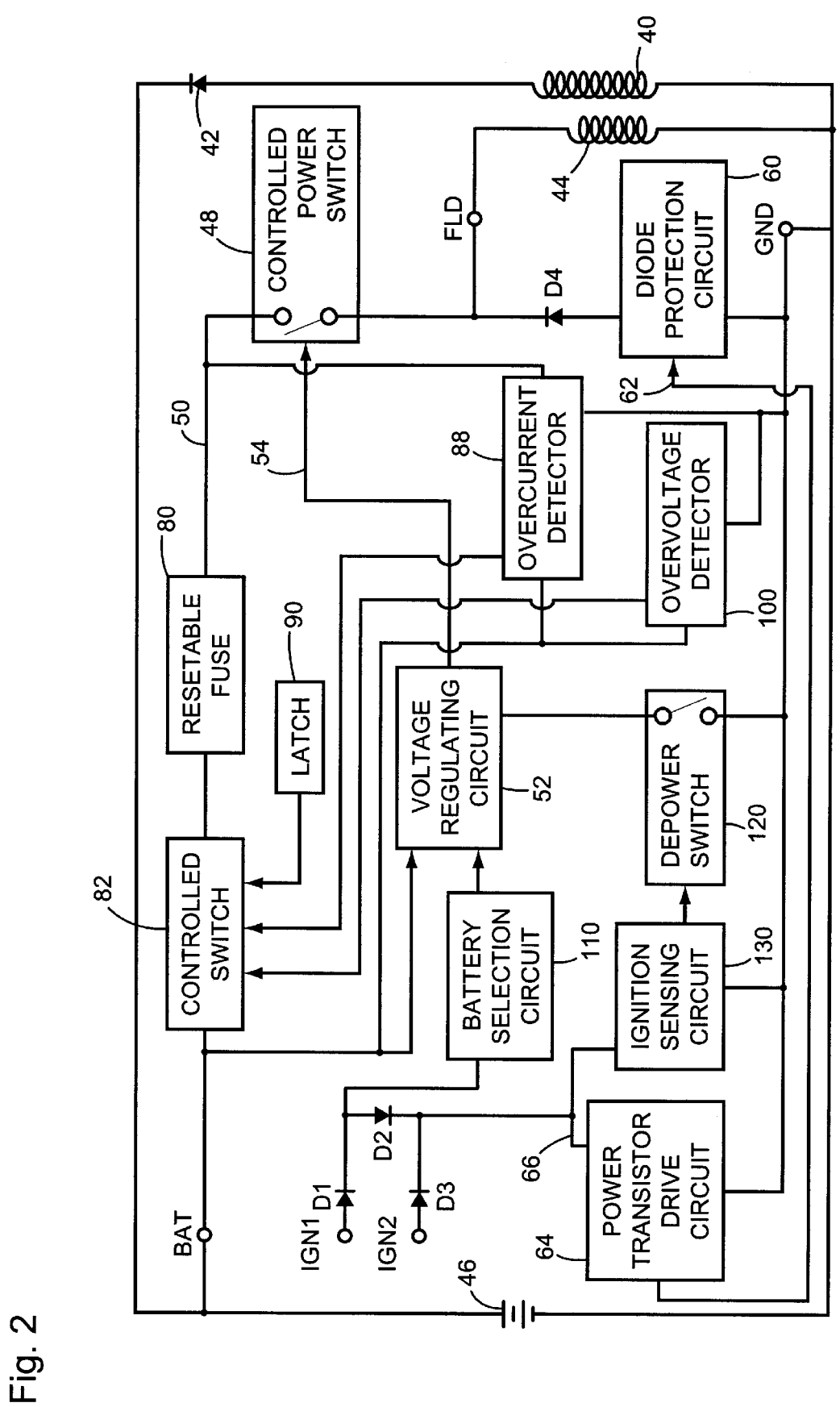
FIG. 2 is a block diagram of the circuit of the present invention.
Figure 3:
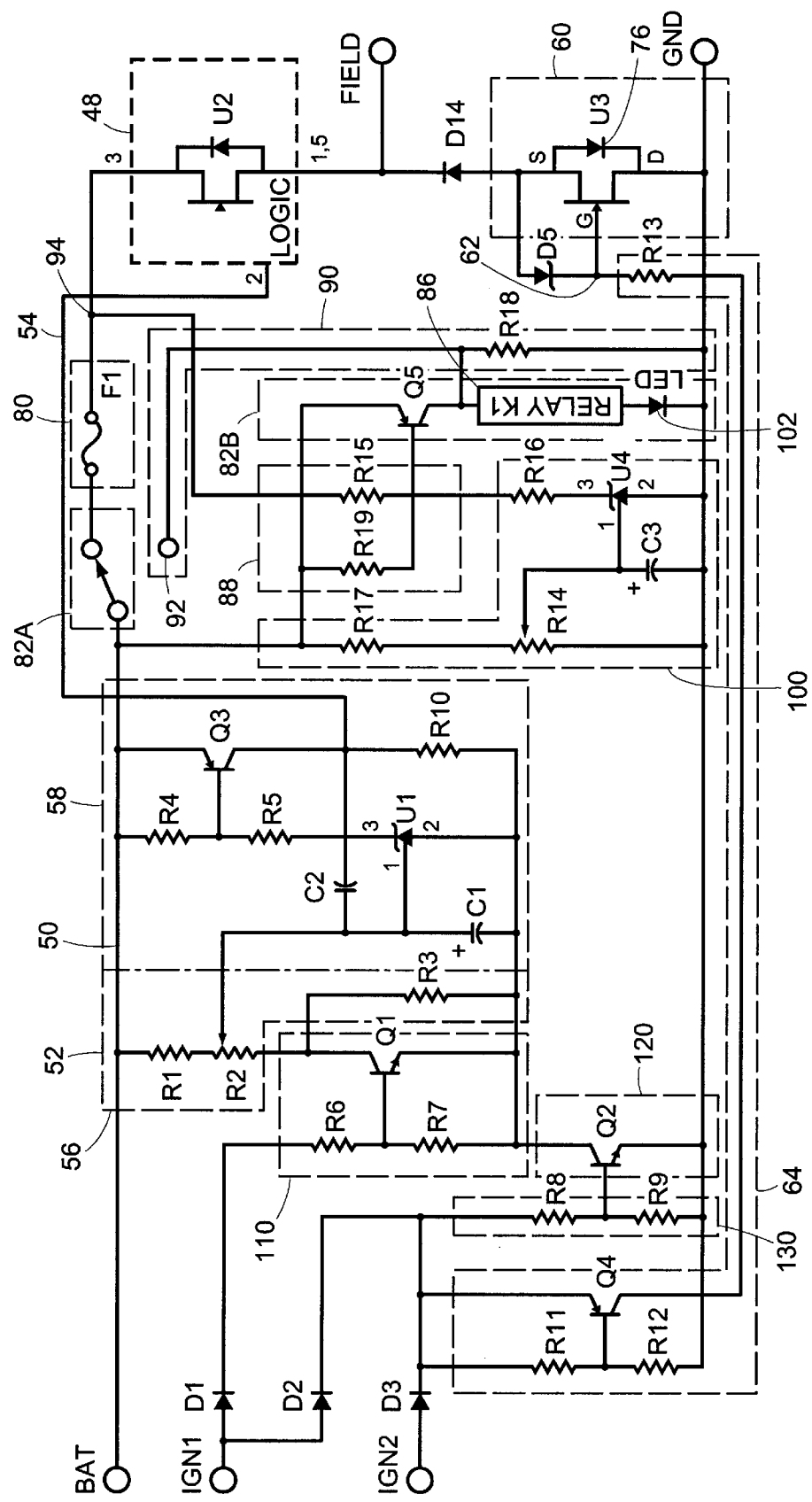
FIG. 3 is a detailed schematic diagram of the preferred embodiment of the invention.

The preferred embodiment of the invention is described with simultaneous reference to FIGS. 2 and 3, although the vehicle electrical system components are illustrated only in FIG. 2. The vehicle electrical system components include the alternator armature 40 and its rectifier diode 42, along with the alternator field winding 44 and the battery 46.

The regulator of the present invention has a controlled power switch 48, which is connected in the series circuit branch 50, extending between a battery terminal BAT and a field coil terminal FLD. An example of a suitable device for use as such a controlled power switch is a PROFET VTS550P, sold by Siemens. A flyback diode D4 is connected in the series circuit branch extending between the field coil terminal FLD and the ground terminal GND and conducts field coil current when the control power switch 48 is open. A voltage regulating circuit 52 has its output 54 connected to the control input of the controlled power switch 48 for turning the power switch off when the battery voltage exceeds a set point reference and turning the power switch on when the battery voltage is less than a set point reference.

The voltage regulating circuit 52 comprises two component subparts, a battery voltage detection circuit 56 and a power switch control circuit 58 (both shown only in FIG. 3) and separated in FIG. 3 by a phantom line. The battery voltage detection circuit 56 is a voltage divider circuit comprising resistor R1, potentiometer R2 and, under some conditions, resistor R3. Potentiometer R2 provides a voltage representing the battery voltage and applied to the power switch control circuit 58. This voltage is applied to an adjustable, precision Zener shunt regulator U1, such as an LM431 manufactured by National Semiconductor. The voltage divider of voltage sensing circuit 56 scales down the battery voltage to approximately 2.5 volts at the nominal, full charged battery voltage. Zener shunt regulator U1 becomes conductive, turning on transistor Q3 and thereby turning off the controlled power switch 48 when the voltage from R2 exceeds 2.5 volts. Zener shunt regulator U1 becomes nonconducting when the voltage from R2 becomes less than 2.5 volts to turn on the controlled power switch 48.

Potentiometer R2 is adjusted so that the controlled power switch 48 is turned on or off as the battery voltage falls respectively below or above its nominal, charged voltage.

A diode protection circuit 60 is interposed in series in the flyback diode D4 circuit branch for protecting the flyback diode D4. The diode protection circuit 60 has a control input 62 connected to the output of a power transistor drive circuit 64. The input 66 of the power transistor drive circuit 64 is connected through diodes D1, D2 and D3 to a pair of regulator ignition terminals IGN1 and IGN2. As explained below, only one of the regulator ignition terminals IGN1 and IGN2 is connected to a vehicle ignition switch and the other remains unconnected.

The preferred diode protection circuit 60 is an autoprotected, power MOSFET integrated circuit having temperature and overcurrent protection circuits. One such device is an Omnifet VNP35N07, sold by SGS-Thomson Micro Electronics. Other similar autoprotected power MOSFETs are also sold under trademarks Tempfet and Profet.

This commercially available power MOSFET integrated circuit device has linear current limitation for protecting the device and also becomes open circuited in the event of excessive thermal dissipation. However, when it cools below a selected temperature it again becomes operable.

Figure 4:
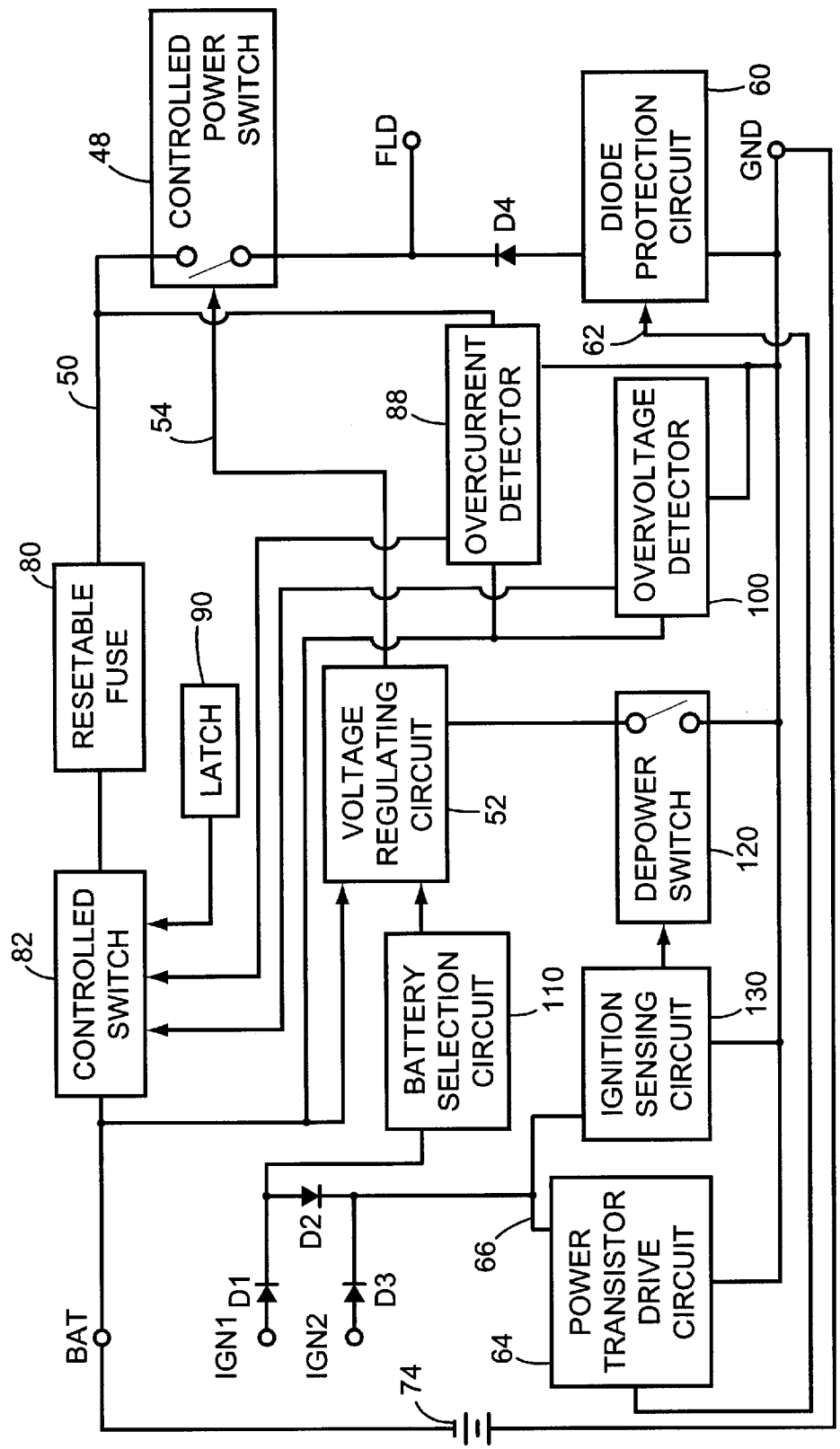
FIGS. 4–10 are block diagrams illustrating the circuit of FIG. 2 in a variety of misconnection and failure modes.

The diode protection circuit 60 protects the flyback diode D4 against reverse connection of the BAT and GND terminals to the battery, as illustrated in FIG. 4. If the battery 74 is mistakenly connected in the reverse direction, the intrinsic diode 76 of the MOSFET U3 is reversed biased, thus preventing excessive current flow through the flyback diode D4. Therefore, if no connection is made of either ignition terminal IGN1 or IGN2 to the vehicle ignition switch, current cannot flow through the flyback diode D4 and therefore it will not be destroyed. However, if the circuit is properly connected to the vehicle electrical system, the battery voltage is applied by the vehicle ignition switch to input resistors R11 and R12 causing bipolar transistor Q4 of the power transistor drive circuit 64 to be turned on, thus switching the MOSFET U3 of the diode protection circuit 60 to a conducting, "on", state. This permits current to flow through diode D4, allowing the circuit to operate in its normal manner. The bipolar transistor Q4, together with its input circuit R11 and R12, isolates the MOSFET U3 from the regulating circuit 52.

Figure 5:
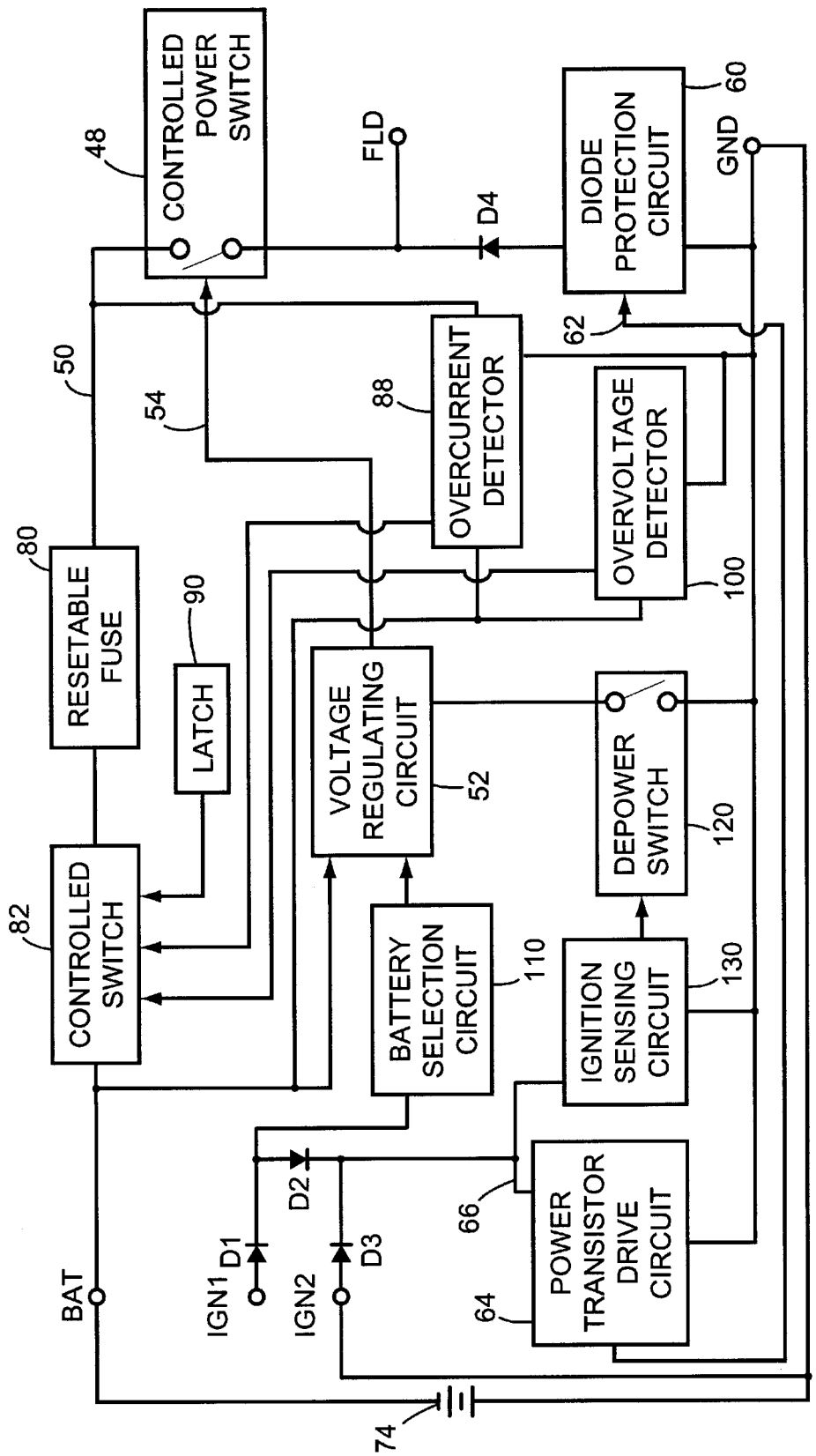

If, however, either ignition terminal IGN1 or IGN2 is properly connected to the vehicle ignition switch and the battery 74 is reverse connected, as illustrated in FIG. 5, the MOSFET U3 of the diode protection circuit 60 is turned on. However, under this condition, because the power MOSFET is of the auto protected type and therefore has overcurrent and thermal protection, the MOSFET U3 of the diode protection circuit will become open-circuited, but will again become operable when its temperature is diminished. This protects the regulator from such an erroneous connection and permits the erroneous connection to be disconnected and the device to be subsequently properly connected without damage to the regulator.

Figure 6:
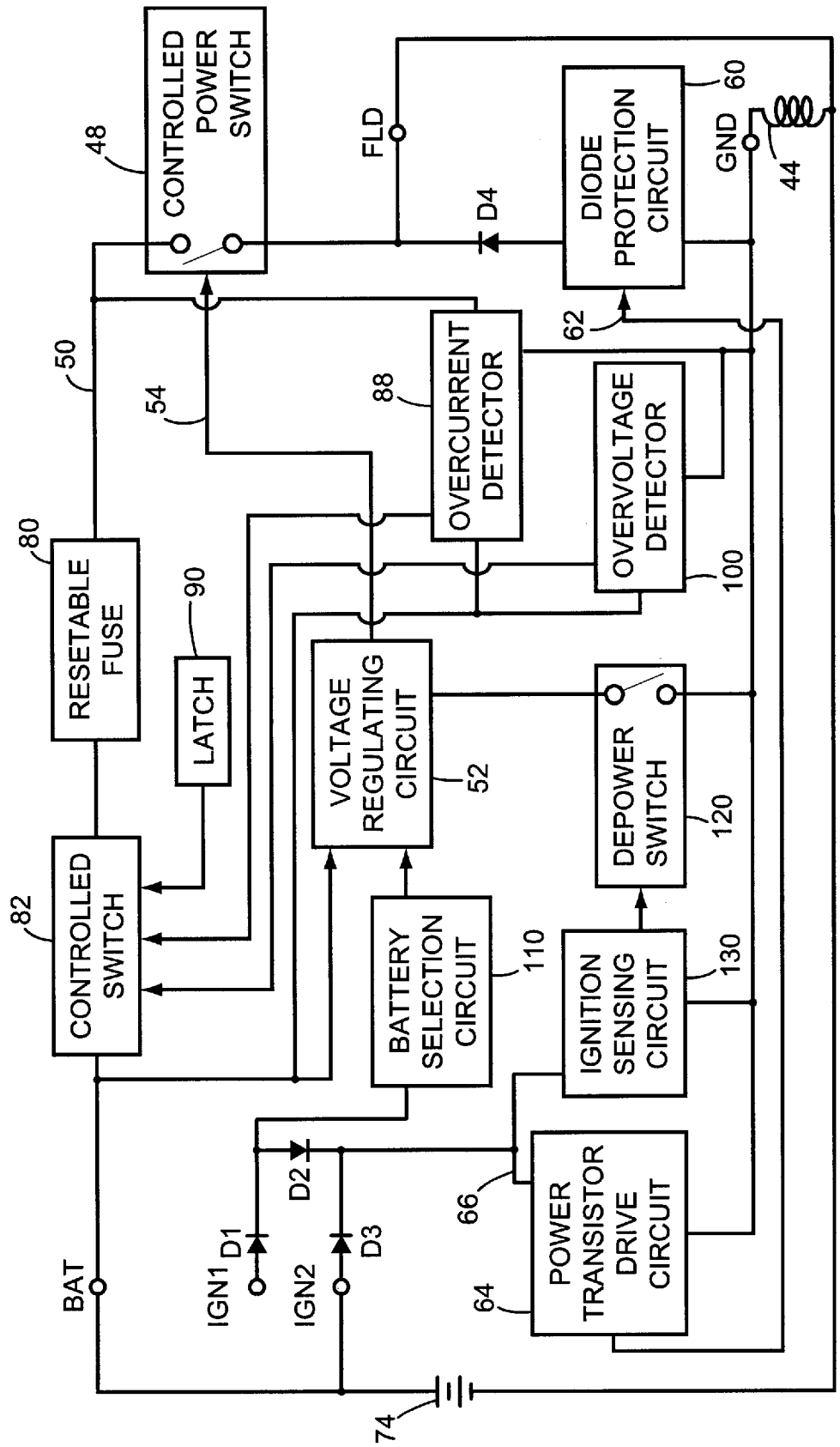

Another possible misconnection is to reverse the field terminal FLD and ground terminal GND connections to the alternator field, as illustrated in FIG. 6. Since the alternator field is connected to ground in the vehicle electrical system, this misconnection would provide a path from the ground terminal GND through the field coil 44, the controlled switch 48, the resetable fuse 80 and the controlled switch 82 to the battery connected at battery terminal BAT which would be sufficient to destroy the controlled switches 48 and 82. However, with the present invention the thermal shutdown feature of the resettable fuse 80 will open the circuit to protect these devices, closing it again after power is disconnected and the resettable fuse 80 cools.

In order to provide additional protection of the controlled power switch 48, a resettable fuse 80 is connected in series with a controlled switch 82 in the circuit branch 50, extending between the battery terminal BAT and the field terminal FLD. The resettable fuse 80 is a polymeric positive temperature coefficient device which operates as a fuse and has the feature that it automatically resets itself when it cools. Such devices are sold under the trademarks Polyswitch, Multifuse and others. Devices of this type have previously been used for protection of automobile lighting circuits. The device may, for example, be a type RUE 900 which opens at approximately 9 or 10 amps.

The controlled switch 82 is preferably a relay having normally closed contacts to form a switch 82A (FIG. 3) and having a relay coil 86 for switching the normally closed switch 82A. The relay coil 86 is connected to bipolar transistor Q5, the base of which forms the control input for controllably switching the controlled switch 82. The base input to transistor Q5 is connected to a voltage detector circuit 88, which is a voltage divider comprising resistor R19 and resistor R15, connected to a circuit node between the field terminal FLD and the series combination of the resettable fuse 80 and the controlled switch 82. The voltage detector circuit 88 is preferably designed to actuate the controlled switch 82 if a sufficient overcurrent occurs that the voltage at the node 94 changes by approximately 2 volts.

A latching circuit 90 is also provided for holding the relay coil 86 of the controlled switch 82 in its actuated position after it has been actuated by the other circuitry. The latching circuit has a resistor R18 connected to the relay coil which is connected to the normally open terminal 92 of the relay 86. Consequently, if the relay is actuated, battery voltage is applied to relay coil 86 through the normally open terminal 92, thereby maintaining energization of the relay coil 86 to hold the relay on, so long as the battery terminal BAT is connected to the battery.

Figure 7:
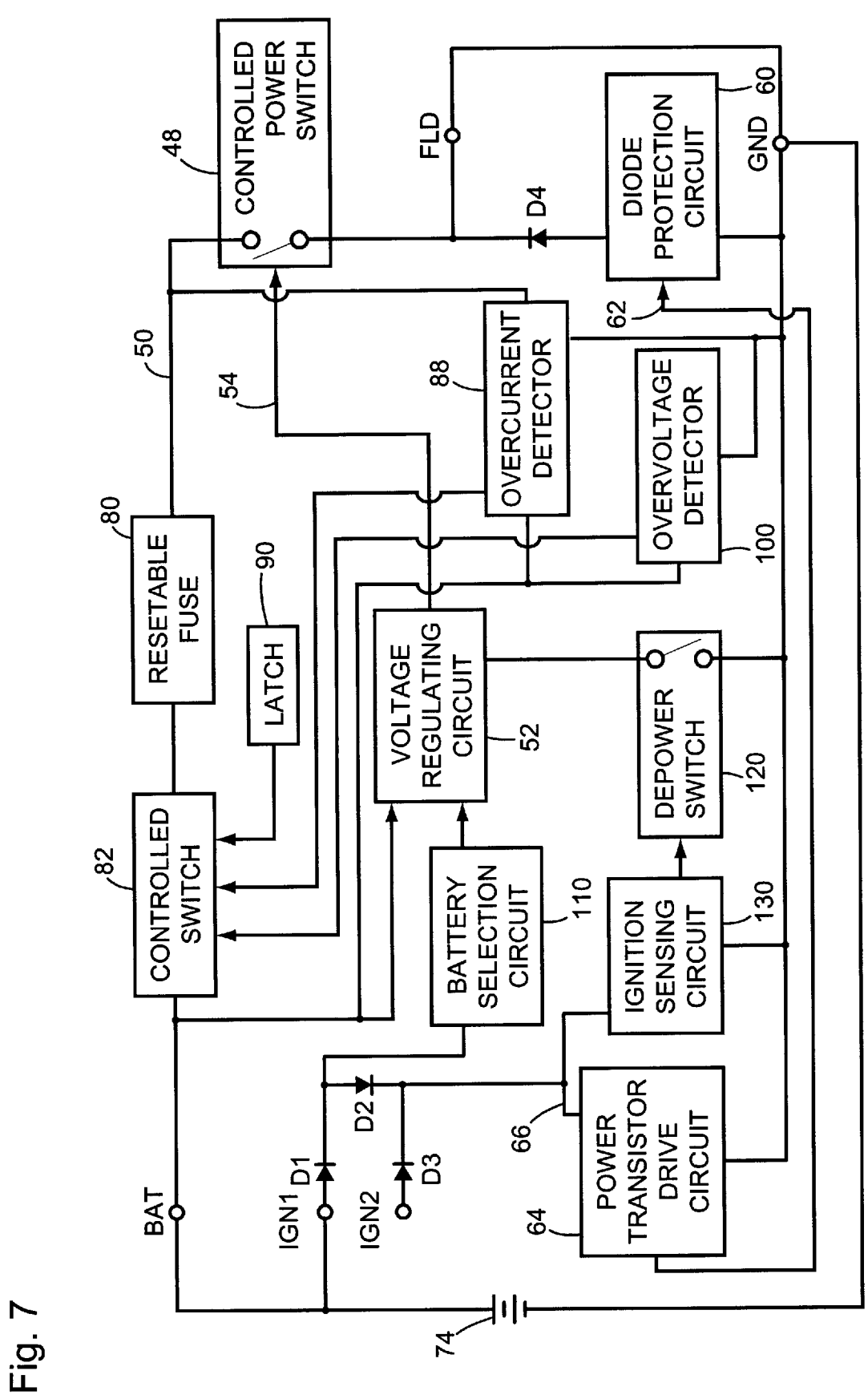
Figure 8:
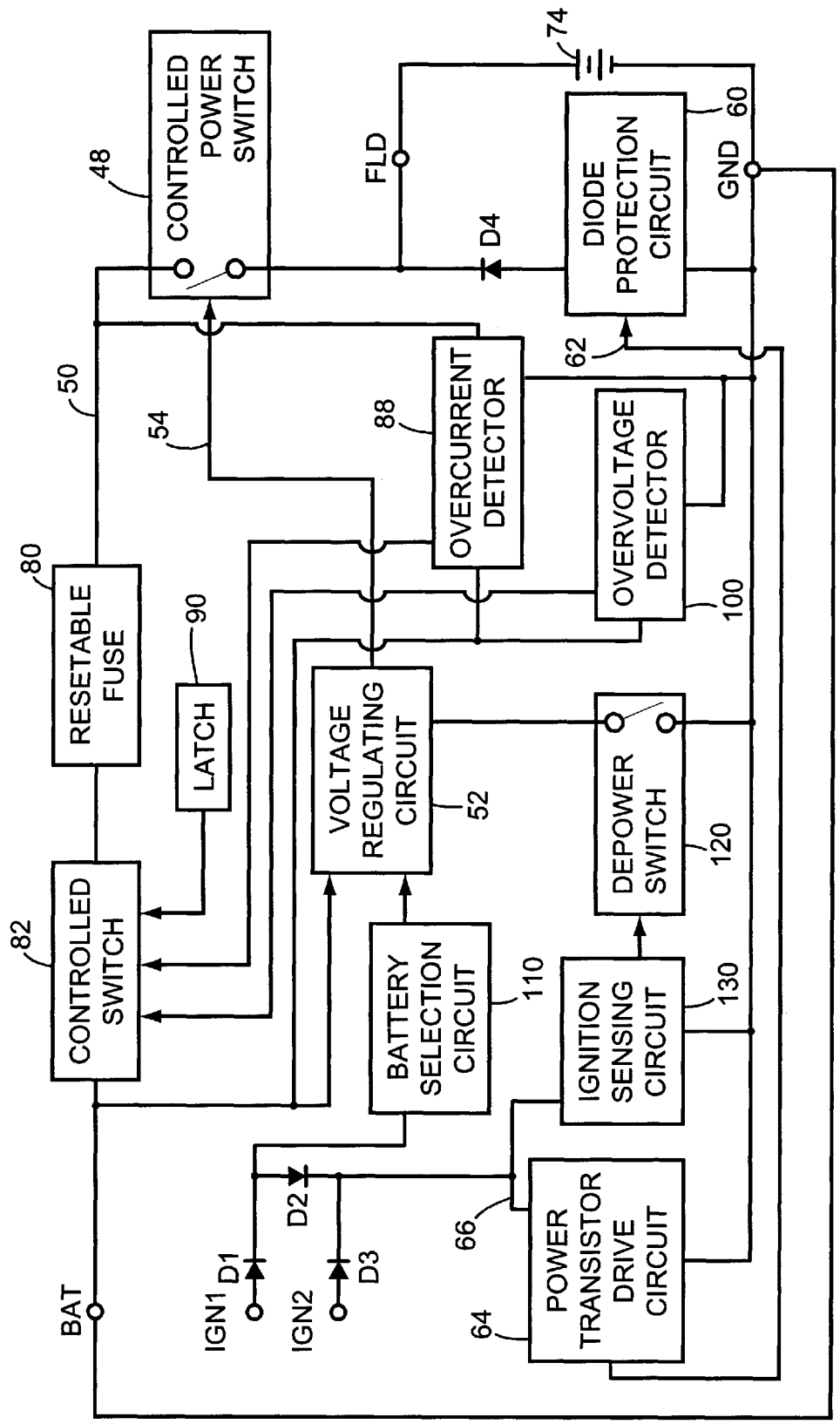

This circuitry protects the controlled power switch 48 against misconnection and failure modes, illustrated in FIGS. 7 and 8. For example, if, as illustrated in FIG. 7, the output terminals FLD and GND are shorted together and the regulator inputs are properly connected, or similarly if the field winding of the alternator becomes short-circuited during operation, an excessive current would begin flowing through the controlled power switch 48. However, with the present invention the resettable fuse 80 will open circuit to protect the controlled power switch 48. Opening of the resettable fuse 80 will substantially increase the voltage across the resettable fuse 80 and cause a substantial decrease in the voltage at the node 94 located between the field coil terminal FLD and the series combination of the resettable fuse 80 and the controlled switch 82. The lowering of the voltage at node 94 causes transistor Q5 to turn on, thus latching the relay coil 86 in its actuated state, so long as voltage is applied to the battery terminal BAT.

The circuit will additionally provide protection in the same manner in the event that the alternator burns up and shorts the field winding while the vehicle is being operated. The system will therefore cease the application of field current to the alternator and thereby avoid burning up wires of the vehicle's electrical system.

Similarly, if an initial misconnection occurs in which the battery is connected to the regulator output between the field terminal FLD and the ground terminal GND, as illustrated in FIG. 8, and the battery terminal BAT is shorted to ground, an excessive current will begin flowing through the intrinsic diode of the controlled power switch 48 (U3 in FIG. 3), causing the resettable fuse 80 to be opened to protect it. The circuit will then be latched open because the resettable fuse will remain open so long as the battery voltage is present at the field terminal FLD to supply a hold current through the fuse 80.

In either of the misconnections illustrated in FIGS. 6 or 7, after the resettable fuse 80 cools, it will again close. If the controlled switch 82 were not latched in its opened position, the circuit would oscillate with the resettable fuse periodically turning on and off and eventually destroying the circuitry. However, with the circuit of the present invention, the circuitry is protected by opening the normally closed switch 82A and maintaining it latched opened until the battery voltage at terminal BAT is removed, thereby removing the source of potential damage to the controlled power switch 48.

The same relay based controlled switch 82 and its latch circuit 90 are also used to provide battery overvoltage protection. For this purpose an overvoltage protection circuit 100 has its input connected to sense the battery voltage. It is therefore preferably connected between the battery terminal BAT and the ground terminal GND for applying a voltage to a voltage reference circuit. More specifically, the resistor R17 and potentiometer R14 scale the battery voltage and apply the scaled voltage to the reference terminal of a Zener shunt regulator U4, which has a reference voltage of 2.5 volts at its reference terminal. Consequently, the potentiometer R14 is adjusted so that when the battery voltage exceeds a selected maximum voltage, such as 16 volts for a 12 volt battery or 32 volts for a 24 volt battery, the voltage applied from potentiometer R14 to the reference terminal of Zener shunt regulator U4 will exceed 2.5 volts, thus causing Zener shunt regulator U4 to begin conducting. This in turn will turn on transistor Q5, thus switching the controlled switch 82 to open normally closed switch 82A of the controlled switch 82 and move the relay wiper to the latching terminal 92 to retain it in this latched position.

Although a substantial overvoltage would open the resettable fuse 80, it is preferable to provide protection at overvoltages substantially below those which would cause the fuse to open because lower overvoltages can also cause damage to accessories connected in the electrical system of the vehicle. Additionally, an overvoltage situation can occur in ways other than and in addition to overcharging of the battery. For example, it sometimes occurs that maintenance people need to jump start a vehicle. They may take a battery or a bank of batteries and apply a higher voltage than the voltage for which the vehicle electrical system is designed. Such an overvoltage also would destroy and require replacement of prior art regulators as well as damaging vehicle accessories.

Figure 9:
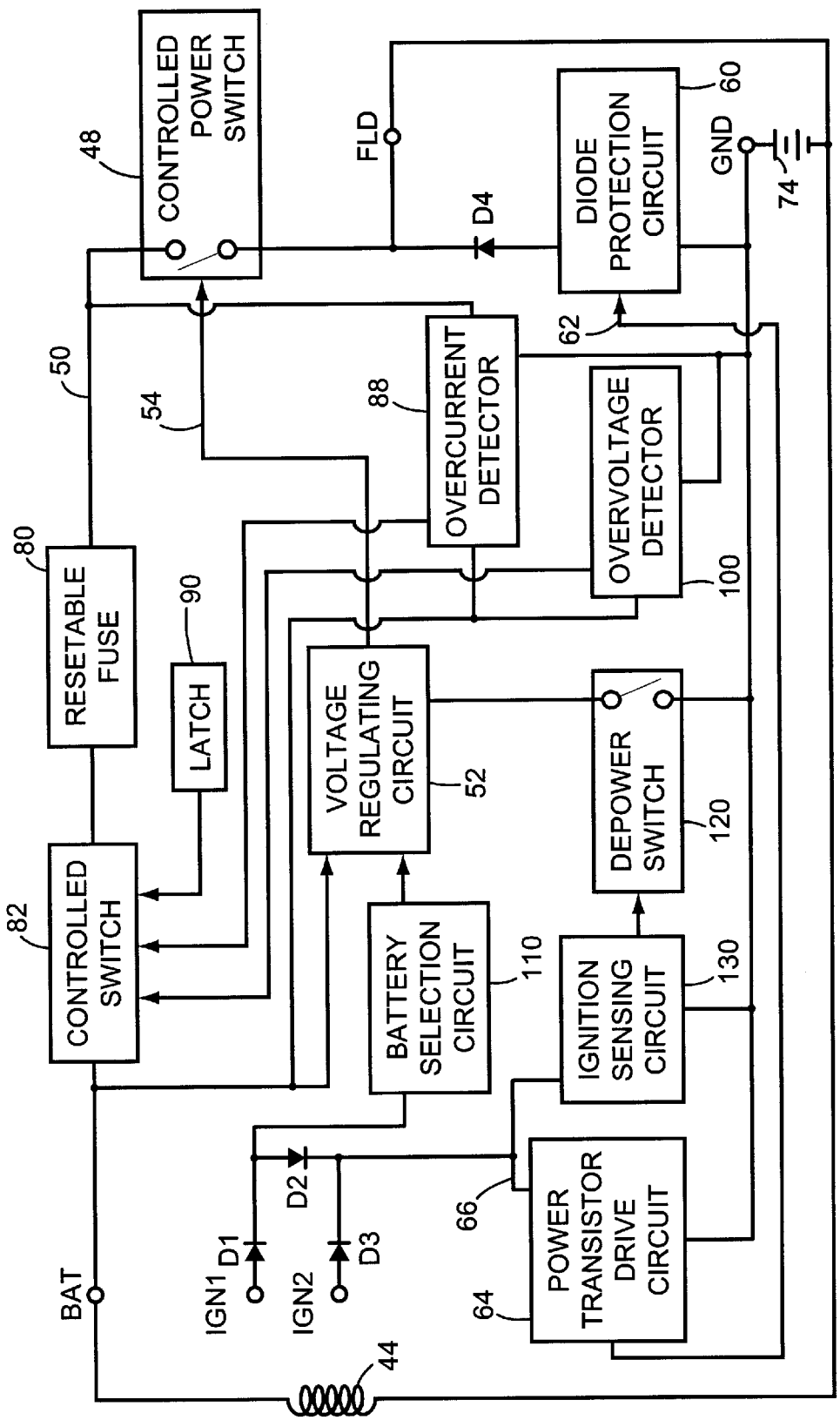

FIG. 9 illustrates yet another possible misconnection in which the battery terminal BAT is connected to the field winding of the alternator, which is connected to vehicle ground, the ground terminal GND is connected to the positive terminal of the battery 74 and the field terminal FLD is connected to ground. In this configuration, the battery 74 is reverse connected to the BAT and GND terminal as in FIG. 4 but this reverse connection is made throught the field winding. Consequently, the protection is accomplished as explained in connection with FIG. 4.

Figure 10:
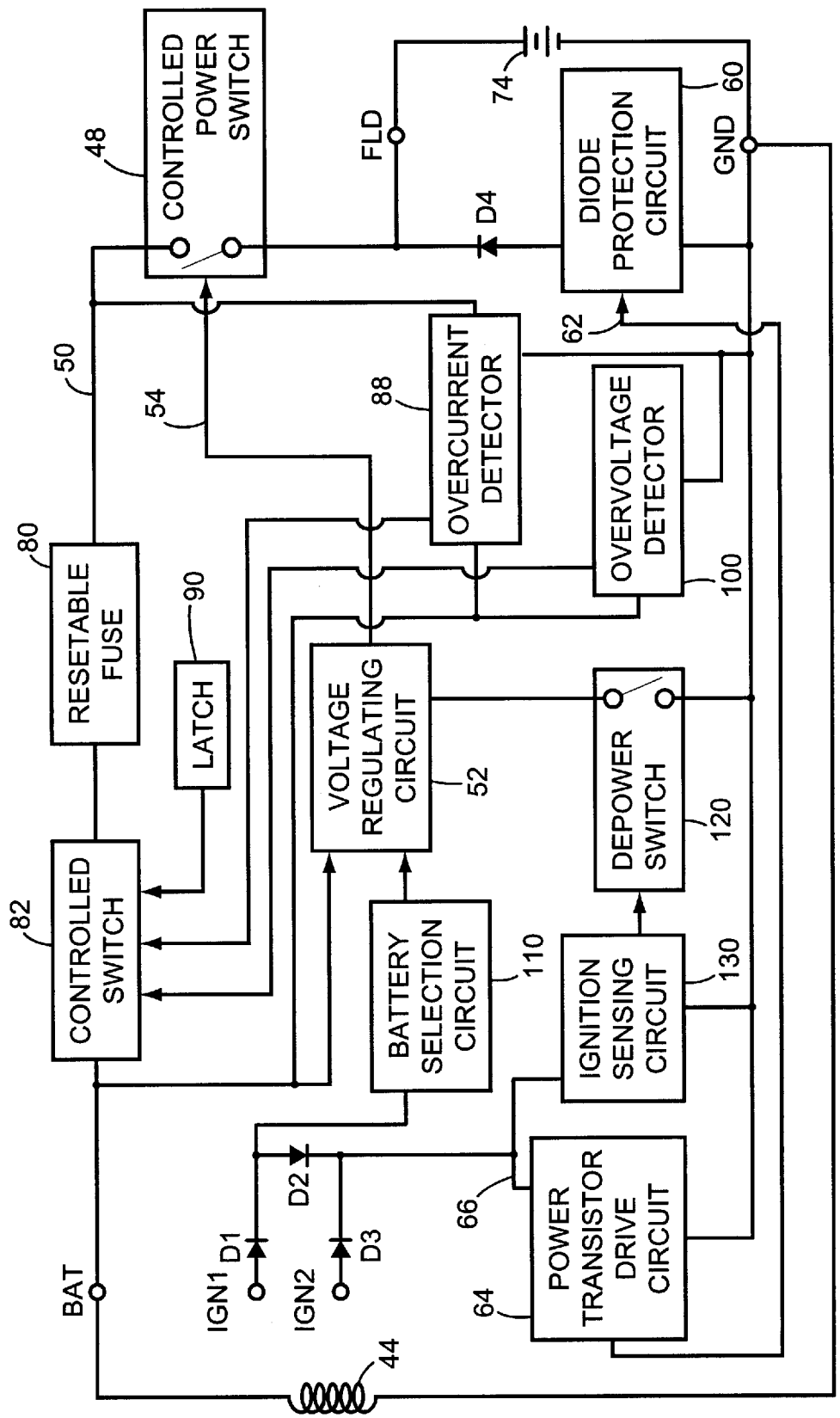

Another misconnection is illustrated in FIG. 10. The battery terminal BAT is connected to the field winding 44, the ground terminal GND is connected to the vehicle ground and the field terminal FLD is connected to the battery 74. This misconnection cause battery voltage to be continuously applied to the field winding through the intrinsic diode of the mosfet U2 forming the controlled power switch 48. This misconnection will herefore cause the battery to become overcharged which will, in turn, actuate the overvoltage protection described above.

A light emitting diode 102 is connected in series with the relay coil 86 in order to signal to maintenance personnel that the controlled switch 82 is latched in its actuated position and therefore the vehicle electrical system requires servicing. It signals the existence of a fault and that they need to disconnect the battery and permit the regulator to reset itself and they need to correct the defect.

Because there are two different types of batteries used on vehicles, maintenance-free batteries and lead-acid batteries, the invention provides two ignition terminals IGN1 and IGN2. These two types of batteries require different full charged voltages. The full charge voltage for a maintenance-free battery is 28.4 volts and the full charge voltage for a lead-acid battery is 27.6 volts. The nominal full charge voltage for 12 volt systems is half of these voltages. Prior art regulators provide a potentiometer to adjust the regulator circuit after installation in order to accommodate the type of battery to which the regulator is connected. Consequently, the prior art system is dependent upon a vehicle manufacturer or service person to properly adjust and calibrate the regulator for whichever type of battery they install. If the power regulator is not adjusted correctly, then the battery will either be undercharged or overcharged.

The circuit of the present invention instead provides a pair of ignition terminals IGN1 and IGN2 for alternative electrical connection to the ignition terminal of a vehicle ignition switch. Terminal IGN1 is connected to the vehicle ignition switch if a maintenance-free battery is installed in the vehicle electrical system and terminal IGN2 is connected if a lead-acid battery is used.

Referring to FIG. 3, a voltage divider circuit consisting of resistors R1 and R3 and potentiometer R2 form a voltage detection circuit applying a scaled voltage representing the battery voltage to Zener shunt regulator U1. However, a battery selection circuit 110 has a transistor switch Q1 with a control input circuit consisting of resistors R6 and R7 connected to the ignition terminal IGN1. If terminal IGN2 is connected to the vehicle ignition switch and terminal IGN1 is unconnected, then transistor Q1 will be turned off and the voltage divider will consist of R1, R2 and R3. However, if terminal IGN1 is connected to the vehicle ignition switch and terminal IGN2 is unconnected, then transistor Q1 will be turned on, thus shorting out resistor R3 when the circuit is operating. Therefore, the transistor Q1 provides a switch which switches the resistor R3 into and out of effective connection in the voltage divider circuit. Consequently, resistor R3 is a circuit component which has two effective states. In one state with terminal IGN1 connected to the vehicle ignition switch, resistor R3 is effectively disconnected from the regulating circuit, thus shifting the scaled voltage applied to the reference terminal of the Zener shunt regulator U1. If, however, the terminal IGN2 is connected to the vehicle ignition switch, then the resistor R3 is switched into the state of connection in the circuit because transistor Q1 is off, thereby switching the scaled voltage applied to Zener shunt regulator U1 to regulate at a lower voltage.

Therefore, terminals IGN1 and IGN2 alter the divider network so that the regulating circuit 52 will regulate the battery voltage at either of the two nominal full charged battery voltages for the two types of batteries. Obviously, other circuits for switching the regulating voltage can be used. For example, a series connected resistor and bipolar transistor can be connected parallel to a divider resistor and switched into the circuit when the transistor is conducting.

The circuit of the invention is therefore calibrated by the manufacturer by adjusting the potentiometer R2 until its wiper voltage is 2.5 volts, when the voltage at terminal BAT is 27.6 volts for a 24 volt system and 13.8 volts for a 12 volt system and terminal IGN2 is connected to the battery.

In order to assure that field current does not flow to the alternator field when the vehicle ignition switch is turned off, thereby permitting 7 or 8 amps of battery drain during nonuse, a depower switch circuit 120 is connected in series with the regulating circuit 52. The depower switch circuit 120 is a bipolar transistor Q2. Its input is connected to an ignition sensing circuit 130, comprising resistors R9 and R8, connected through diodes D2 and D3 to ignition terminals IGN1 and IGN2. As a consequence, when the vehicle ignition switch is turned off so that battery voltage is not applied to terminal IGN1 or terminal IGN2, the transistor Q2 is turned off, thus depowering the regulating circuit 52. Depowering of the regulator circuit therefore turns off controlled power switch 48 while the vehicle is inactive.

Figure 11:
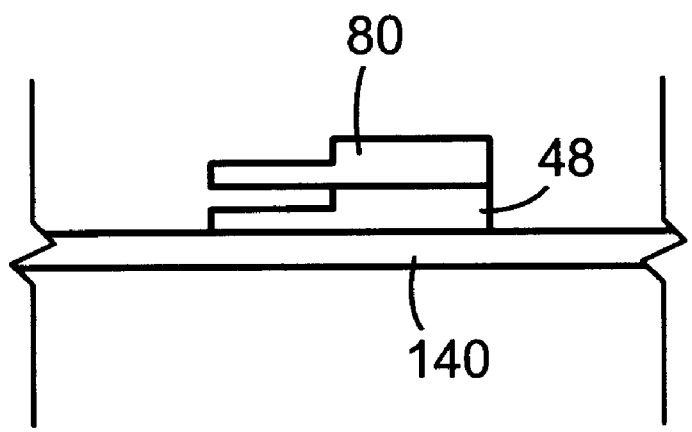
FIG. 11 is a view in side elevation of a resettable fuse mounted in thermal connection on top of a controlled power switch.

Referring to FIG. 11, in order to improve the effectiveness of the resettable fuse 80, the resettable fuse 80 is physically mounted to the controlled power switch 48, which is a power switching MOSFET, which in turn is mounted to a printed circuit board 140. Preferably, these are mounted in this configuration so that the printed circuit board is oriented in horizontal alignment in the operable, installed position of the regulator of the present invention. By mounting the resettable fuse 80 in thermal connection, preferably in direct physical connection to the controlled power switch 48, the polyswitch fuse 80 is also made responsive to excessive temperature of the controlled power switch 22. A typical polyswitch resettable fuse 80 opens at 150° C., but a substantial current is needed to raise it to that temperature. The preferred, thermally connected mounting has two desirable consequences. First, if the MOSFET controlled power switch 48 is heating up but the current is not sufficient to otherwise open the resettable fuse 80, the heat from the MOSFET will increase the temperature of the fuse 80 and open the resettable fuse 80 to protect the circuit. Additionally, if the controlled power switch 48 is damaged and consequently shorts the battery voltage directly and continuously to the field winding 44, the resettable fuse will also open earlier to protect the vehicle electrical system. Therefore, the resettable fuse is made, by this configuration, responsive not only to heating and currents determined by the parameters of its design, but additionally can respond to the heating of the controlled power switch MOSFET.

While certain preferred embodiments of the present invention have been disclosed in detail, it is to be understood that various modifications may be adopted without departing from the spirit of the invention or scope of the following claims.

What is claimed is:

1. A flyback diode protection circuit for a battery voltage regulator, the regulator having (i) a controlled power switch in series in a circuit branch between a battery terminal and a field coil terminal for, at times, applying battery voltage to the field coil, (ii) a voltage regulating circuit having a battery voltage detection circuit connected between a battery terminal and a ground terminal and a power switch control circuit connected to the voltage detecting circuit for turning the power switch off when the battery voltage exceeds a set value and turning the power switch on when the battery voltage is less than a set value, and (iii) a flyback diode connected in series in a circuit branch between the field coil terminal and the ground terminal for conducting field coil current when the controlled power switch is open, wherein the improvement comprises:

a) a power transistor interposed in series in the diode circuit branch for protecting the diode and having a control input; and
   b) a power transistor drive circuit having an output connected to the control input of the power transistor and an input connected to a regulator ignition terminal, the regulator ignition terminal being for electrical connection to an ignition terminal of a vehicle ignition switch for turning on the power transistor when a voltage is present at the ignition terminal of the vehicle ignition switch and for turning the power transistor off when a voltage is not present.

2. A protection circuit in accordance with claim 1, wherein the power transistor is a power, MOSFET transistor and the control input is a gate terminal of the power MOSFET transistor.

3. A protection circuit in accordance with claim 2 wherein the MOSFET transistor is an autoprotected power MOSFET integrated circuit having temperature and overcurrent protection circuits.

4. A protection circuit in accordance with claim 1 or 2 or 3 wherein the regulator further has a second regulator ignition terminal also connected to the input of said power transistor drive circuit, the first and second regulator ignition terminals being for alternative connection of a selected one of the regulator ignition terminals to an ignition terminal of a vehicle ignition switch, one regulator ignition terminal connected for a battery of a first type and the other regulator ignition terminal connected for a battery of a second type.

5. A protection circuit in accordance with claim 4 wherein the power transistor drive circuit includes a bipolar transistor having input bias resistors and an output connected to the control input of the power transistor for isolating the power transistor from the regulating circuit.

6. An overcurrent protection circuit for a battery voltage regulator having (i) a controlled power switch in series in a circuit branch between a battery terminal and a field coil terminal for, at times, applying battery voltage to the field coil, (ii) a regulating circuit having a battery voltage detection circuit connected between a battery terminal and a ground terminal and a power switch control circuit connected to the voltage detecting circuit for turning the power switch off when the battery voltage exceeds a set value and turning the power switch on when the battery voltage is less than a set value, and (iii) a diode connected in series in a circuit branch between the field coil terminal and the ground terminal for conducting field coil current when the power switch is opened, wherein the protection circuit comprises:

a) a resettable fuse including thermal protection for opening the fuse in response to heating above a selected temperature and closing the fuse when the fuse temperature falls below a selected temperature, the resettable fuse being interposed in series in the controlled power switch circuit branch between the battery terminal and the field coil terminal;
   b) a controlled switch having a control input and having switched terminals connected in series with the resettable fuse and interposed in series in the controlled power switch circuit branch between the battery terminal and the field terminal; and c) a voltage detector having an input terminal connected between the field coil terminal and the series combination of (i) the resettable fuse and (ii) the controlled power switch, the voltage detector having an output connected to the control input of the controlled switch for opening the controlled switch when the resettable fuse is opened.

7. A protection circuit in accordance with claim 6 further comprising a latching circuit connected to the controlled switch for holding the controlled switch open after the controlled switch has been opened.

8. A protection circuit in accordance with claim 7 wherein the controlled switch comprises normally closed terminals of a relay and wherein the latching circuit includes a pair of normally open terminals on the relay connected in series between the battery terminal an actuating coil of the relay.

9. A protection circuit in accordance with claim 7 and further comprising a resettable overvoltage protection circuit having a voltage detector including a voltage reference circuit having a reference voltage, the voltage detector having an input terminal connected between the battery terminal and the ground terminal for applying a voltage to the voltage reference circuit and having an output terminal connected to the control input of the controlled switch for opening the controlled switch when the applied voltage exceeds the reference voltage.

10. A protection circuit in accordance with claim 9 wherein the controlled switch is a relay having normally closed and normally open terminals and wherein the controlled switch includes the normally closed terminals and the latching circuit includes the normally open terminals connected in series between the battery terminal and an actuating coil of the relay.

11. A protection circuit in accordance with claim 10 wherein the voltage detector comprises a voltage divider circuit connected to a Zener shunt regulator.

12. A resettable overvoltage protection circuit for a battery voltage regulator having a (i) controlled power switch in series in a circuit branch between a battery terminal and a field coil terminal for, at times, applying battery voltage to the field coil, (ii) a regulating circuit having a battery voltage detection circuit connected between a battery terminal and a ground terminal and a power switch control circuit connected to the voltage detecting circuit for turning the power switch off when the battery voltage exceeds a set value and turning the power switch on when the battery voltage is less than a set value, and (iii) a diode connected in series in a circuit branch between the field coil terminal and the ground terminal for conducting field coil current when the power switch is opened, the protection circuit comprising:

a) a controlled switch having a control input and having switched terminals connected in series in the controlled power switch circuit branch between the battery terminal and the field terminal; and b) a voltage detector including a voltage reference circuit having a reference voltage, the voltage detector having an input terminal connected between the battery terminal and the ground terminal for applying a voltage to the voltage reference circuit and having an output terminal connected to the control input of the controlled switch for opening the controlled switch when the applied voltage exceeds the reference voltage; and c) a latching circuit connected to the controlled switch and to the battery terminal for holding the controlled switch open after the controlled switch is opened by the voltage detector.

13. A protection circuit in accordance with claim 12 wherein the controlled switch is a relay having normally closed and normally open terminals and wherein the controlled switch includes the normally closed terminals of a relay and the latching circuit includes the normally open terminals on the relay connected in series between the battery terminal an actuating coil of the relay.

14. A protection circuit in accordance with claim 13 wherein the voltage detector comprises a voltage divider circuit connected to a Zener shunt regulator.

15. An improved battery voltage regulator having a regulating circuit for maintaining a battery at a selected voltage, the regulating circuit including a component upon which the magnitude of the selected voltage is dependent, wherein the improvement is a battery voltage selection circuit comprising:

a) a pair of input ignition terminals for alternative electrical connection to an ignition terminal of a vehicle ignition switch, one ignition terminal for connection to a battery of a first type and one ignition terminal for connection to a battery of a second type;

b) a switch having a control input connected to a first one of the input ignition terminals, the switch connected to said component of the regulating circuit for switching the component into one of two alternatively selected states, one state being effective connection in the regulating circuit and the other state being effective disconnection from the regulating circuit, one state being selected when the first input ignition terminal is connected to the vehicle ignition switch and another state being selected when the first input ignition terminal is not connected to the vehicle ignition switch.

16. A regulator in accordance with claim 15 wherein said switch is a bipolar transistor switching circuit.

17. A regulator in accordance with claim 15 wherein said component of the regulating circuit is one of at least two resistances.

18. A regulator in accordance with claim 17 wherein said resistances are a part of a voltage divider circuit for sensing the battery voltage and said switch is connected parallel to said one of resistances.

19. A regulator in accordance with claim 18 wherein said switch is a bipolar transistor switching circuit.

20. A regulator in accordance with claim 19 wherein the regulating circuit includes a Zener shunt regulator having the voltage divider connected to the Zener shunt regulator's reference input terminal.

21. An improved battery voltage regulator having a controlled power switch connected in series in a circuit branch between a first terminal for connection to a battery and a field coil terminal for, at times, applying battery voltage to the field coil, wherein the improvement comprises:

a resettable fuse including thermal protection for opening the fuse in response to heating above a selected temperature and closing the fuse when the fuse temperature falls below a selected temperature, the resettable fuse being interposed in series electrical connection in said circuit branch, the resettable fuse being physically mounted in thermal connection to the controlled power switch.

22. A regulator in accordance with claim 20 wherein the resettable fuse is mounted in direct physical contact with the controlled power switch.

23. A regulator in accordance with claim 22 wherein the controlled power switch is a power MOSFET.

24. A regulator in accordance with claim 22 wherein the controlled power switch is mounted in a horizontal operable orientation on a printed circuit board and the resettable fuse is mounted above it.

* * * * *